United States Patent
Holmes et al.

(10) Patent No.: US 7,610,636 B2
(45) Date of Patent: Nov. 3, 2009

(54) IN-VEHICLE LIFT MECHANISM

(75) Inventors: James K. Holmes, Niles, MI (US);
Douglas J. Yoder, Nappanee, IN (US);
Gary D. Peter, Middlesburg, IN (US)

(73) Assignee: Actuant Corporation, Glendale, WI (US)

( * ) Notice: Subject to any disclaimer, the term of this patent is extended or adjusted under 35 U.S.C. 154(b) by 0 days.

(21) Appl. No.: 11/630,932

(22) PCT Filed: Jun. 29, 2005

(86) PCT No.: PCT/US2005/023281

§ 371 (c)(1),
(2), (4) Date: Dec. 19, 2007

(87) PCT Pub. No.: WO2006/007522

PCT Pub. Date: Jan. 19, 2006

(65) Prior Publication Data
US 2008/0129086 A1 Jun. 5, 2008

Related U.S. Application Data

(60) Provisional application No. 60/584,625, filed on Jul. 1, 2004.

(51) Int. Cl.
*A47C 17/64* (2006.01)
*B60J 7/00* (2006.01)
(52) U.S. Cl. ............. 5/118; 5/11; 105/317; 296/190.02
(58) Field of Classification Search ............ 296/190.02, 296/190.01, 156, 164, 168; 5/118, 10.2, 5/10.1, 11; 105/317
See application file for complete search history.

(56) References Cited

U.S. PATENT DOCUMENTS

| 5,984,404 | A | 11/1999 | Novoa et al. |
| 6,254,171 | B1 | 7/2001 | Young, Sr. |
| 6,507,962 | B2 | 1/2003 | Thurston |
| 2004/0262949 | A1* | 12/2004 | Rasmussen ................. 296/158 |

OTHER PUBLICATIONS

International Search Report and Written Opinion corresponding to PCT/US2005/023281, under date of mailing of Feb. 16, 2006.

* cited by examiner

*Primary Examiner*—Joseph D Pape
(74) *Attorney, Agent, or Firm*—Quarles & Brady LLP

(57) ABSTRACT

The invention provides a vertical lift mechanism (10) for a bunk bed within a recreational vehicle. The mechanism includes a lateral support assembly (14) that travels up and down in an upright frame assembly (34). The lifting force is provided by a drive unit (12) mounted to the support assembly (14) that winds and unwinds a flexible member (18) through a guide arrangement (68, 70, 72, 74, 76, 78, 80, 82) mounted to the support assembly (14). The flexible member (18) is preferably an assembly of cables, more preferably four primary cables (52, 54, 56, 58) each having one end attached to the ceiling of the vehicle and their opposite ends coupled together and linked to a leader cable (50) which is wound about the drive spindle (44). The primary cables (52, 54, 56, 58) travel around the guides (68, 70, 72, 74, 76, 78, 80, 82), which can be an arrangement of single and double sheaves or pulleys, to translate the winding force to vertical forces that raise or lower the support assembly (14).

15 Claims, 7 Drawing Sheets

IN-VEHICLE LIFT MECHANISM

CROSS-REFERENCE TO RELATED APPLICATION

Not applicable.

STATEMENT OF FEDERALLY SPONSORED RESEARCH OR DEVELOPMENT

Not applicable.

BACKGROUND OF THE INVENTION

1. Technical Field

The present invention relates to recreational vehicles, and more particularly to lifting mechanisms for raising and lowering furniture within the interiors of such vehicles.

2. Description of the Related Art

In order to increase the available interior space of recreational vehicles or trailers, slide-out sections, such as rooms or closets, can be made integral with the structure of the vehicle or trailer. These slide-out sections usually include a floor, a roof, an end wall and one or more side walls. In the retracted position the roof, floor and side walls are typically inside the vehicle, concealed from exterior view, and the end wall forms a portion of the vehicle's exterior side wall. During transit, these sections are retracted and stored in the interior of the vehicle, with the exterior wall of the slide-out section being flush with the exterior of the vehicle. To use the slide-out section, the vehicle is first parked and leveled. The slide-out room is then slid outward from the vehicle, thereby increasing the interior space of the vehicle.

Various drive assemblies exist to extend and retract the slide-out sections. These drive assemblies can be manual or powered, including hydraulics, pneumatics, electronics, simple gearing mechanisms, cable and pulley arrangements, or various combinations thereof. U.S. Pat. No. 6,254,171 discloses one type of operating mechanism for a slide-out room.

Slide out room assemblies can add prohibitive cost and weight to a vehicle such that other methods must be employed to increase interior seating and like space. Moreover, even if the vehicle is equipped with a slide-out room additional interior space may be desired in the slide-out room.

SUMMARY OF THE INVENTION

The present invention provides a lift mechanism for raising and lowering a platform in an interior of a recreational vehicle (including any self-propelled or pull-along wheeled body). The lift mechanism includes a frame, a drive unit, a support member supporting the platform and vertically moveable relative to the frame, an elongated flexible member having a first end linked to the drive unit and a second end fixed relative to the frame, and at least one guide member engaging the flexible member between the first and second ends and directing the flexible member through at least one turn. The drive unit drives the first end of the flexible member to adjust the height of the support member.

In preferred forms, the drive unit includes an electric motor mounted to the support member, which is a lateral framework assembly which rides up and down within an upright frame assembly. The flexible member can be a cable and the guide member can be one or more, one preferred form having eight, rotatable sheaves or pulleys, having single or multiple grooves.

The flexible member can include multiple elongated segments, each segment having a first end coupled together with the first ends of the other segments and to the drive unit and each segment having a second end coupled to the vehicle. The flexible member can also include a leader segment extending between a rotatable spindle of the drive unit and the first ends of the elongated segments. Travel of the first ends in one direction raises the support member and travel of the first ends in an opposite direction lowers the support member.

Most preferably, the invention provides a lift mechanism for a bunk bed within a recreational vehicle. The mechanism includes a lateral support assembly that travels up and down in an upright frame assembly. The lifting force is provided by a drive unit mounted to the support assembly that winds and unwinds a flexible member through a guide arrangement mounted to the support assembly. The flexible member is preferably an assembly of cables, more preferably four primary cables each having one end attached to the ceiling of the vehicle and their opposite ends coupled together and linked to a leader cable which is wound about the drive spindle. The primary cables travel around the guides, which can be an arrangement of single and double sheaves or pulleys, to translate the winding force to vertical forces that raise or lower the support assembly.

Another aspect of the invention is a recreational vehicle having a vertical lift mechanism in its interior. The vehicle has a wheeled chassis supporting a vehicle body defining the interior and containing the lift mechanism. The lift mechanism raises and lowers a platform using an elongated flexible member having a first end linked to a drive unit and a second end linked to a fixed member, such an interior frame member or a frame of the vehicle. At least one guide member engages the flexible member between the first and second ends to direct the flexible member through at least one turn as the drive unit drives the first end of the flexible member to adjust the height of the platform.

The advantages of the invention will be apparent from the detailed description and drawings. What follows is a preferred embodiment of the present invention. To assess the full scope of the invention the claims should be looked to as the preferred embodiment is not intended as the only embodiment within the scope of the invention.

DETAILED DESCRIPTION OF THE PREFERRED EMBODIMENT

Figure 1:
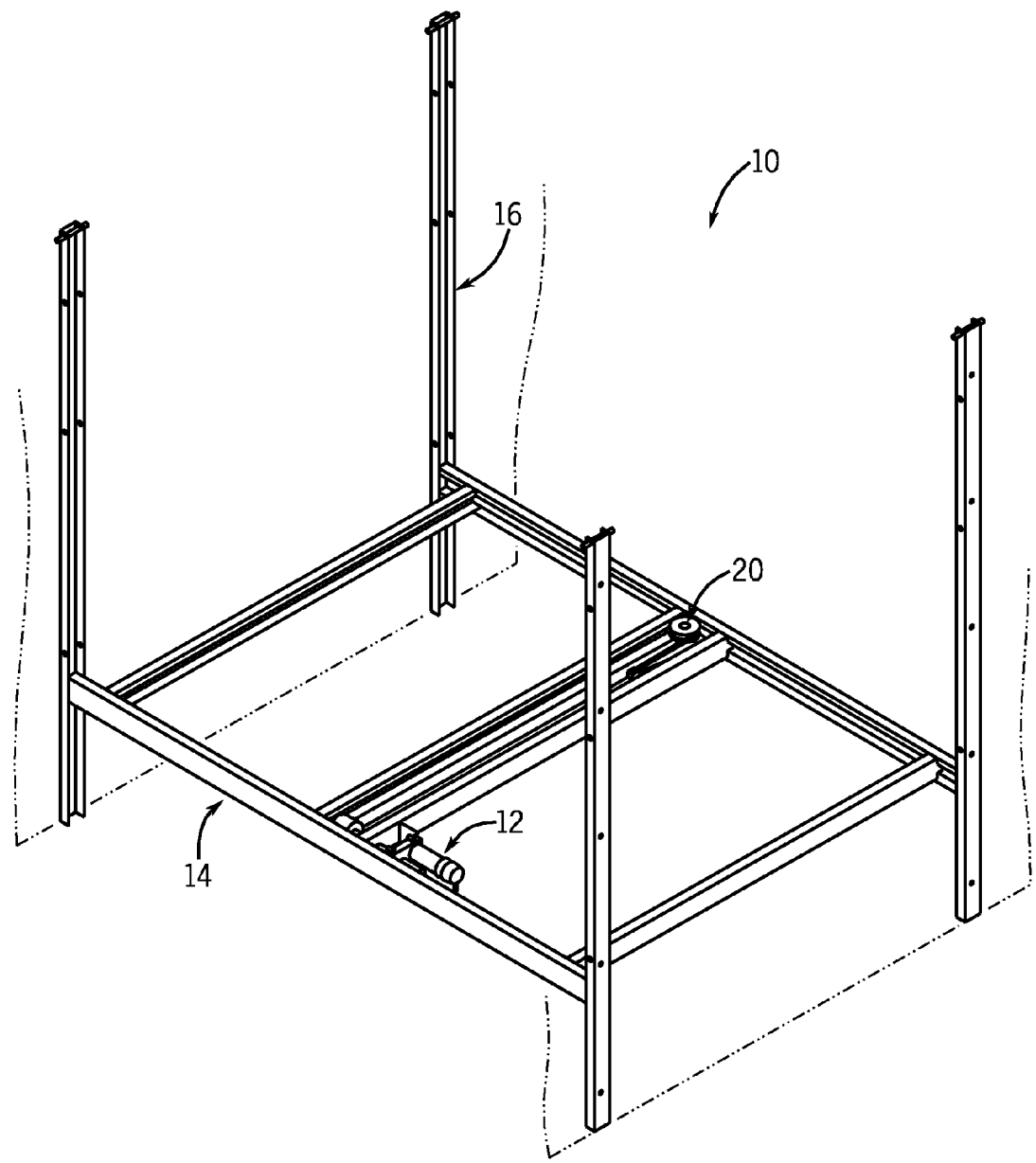
FIG. 1 is a rear perspective view of a bunk lift mechanism for an interior of a vehicle, showing a support assembly in a lowered position.
Figure 2:
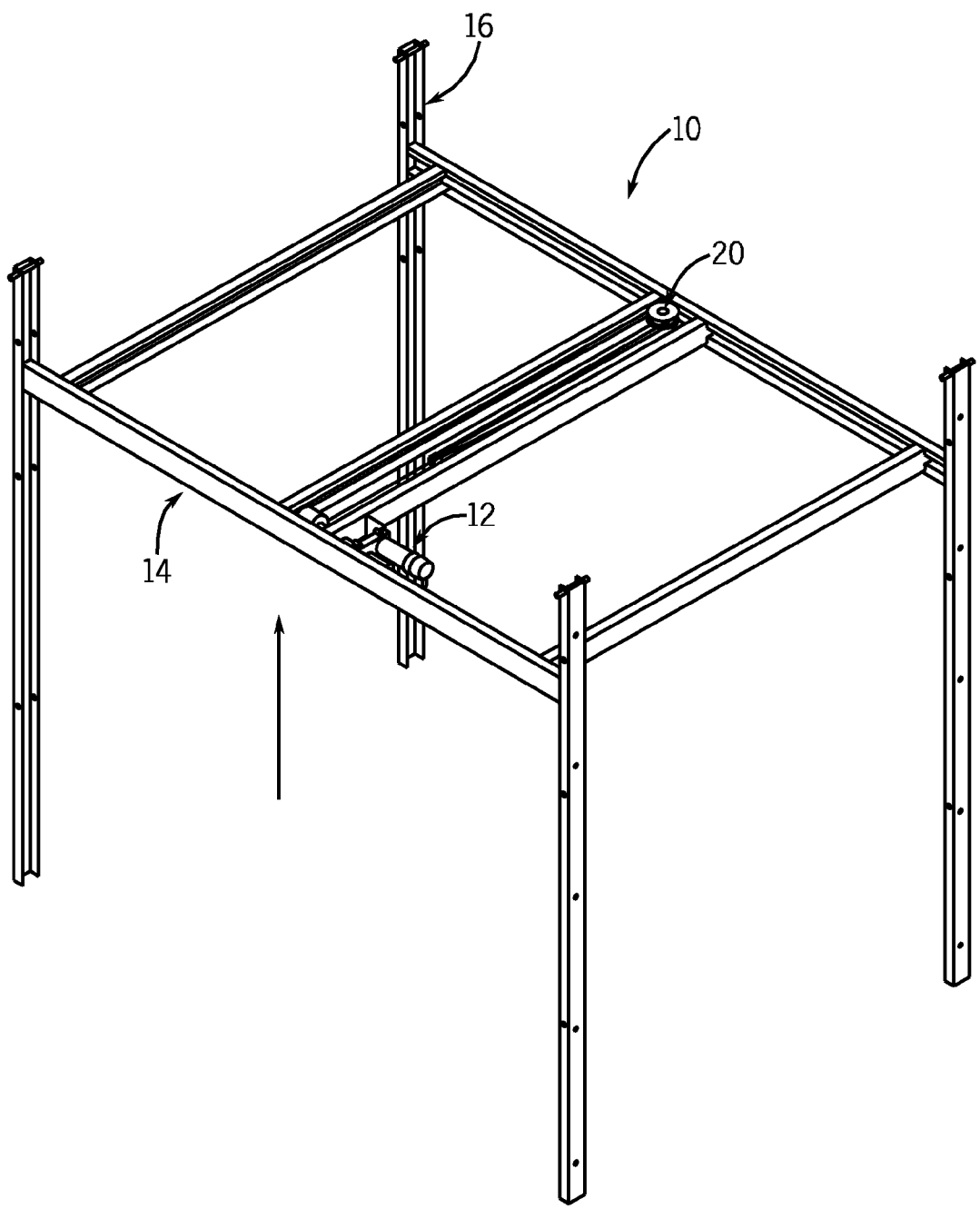
FIG. 2 is a rear perspective view similar to FIG. 1 albeit showing the support assembly in an elevated position.

Although not shown in the drawings, the present invention is preferably used in a passenger vehicle, such as a tow-along trailer or self-propelled (motorhome) recreational vehicle. The lift mechanism 10 shown in FIGS. 1-3 can be advantageously used to vertically elevate a bed or other apparatus for sitting or laying on, and thereby clear floor space in the interior of the vehicle. It could also be positioned straddling a pullout couch to create two beds when the couch is pulled out and the movable platform is lowered to a position spaced below the ceiling and spaced above the couch bed. The lift mechanism 10 is shown in its lowered position in FIG. 1 and shown elevated in FIG. 2. The lift mechanism 10 can be mounted within an extendable and retractable slide-out section of the vehicle to provide further space-saving benefits. Such slide-out sections are well known to have a floor, ceiling, upright end wall and two upright side walls, which form a part of the vehicle exterior when extended.

Figure 3:
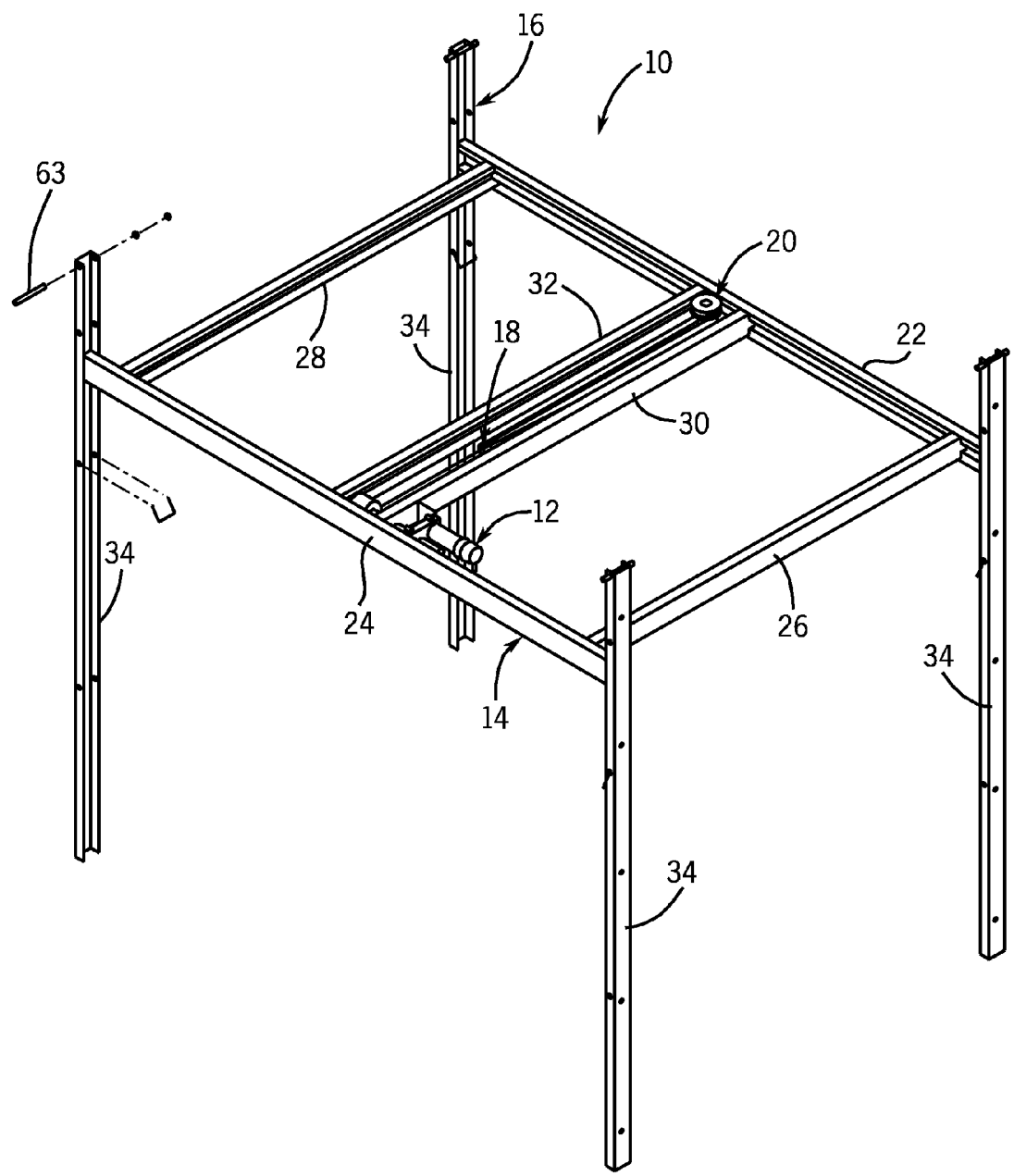
FIG. 3 is a rear perspective view similar to FIG. 2.
Figure 4:
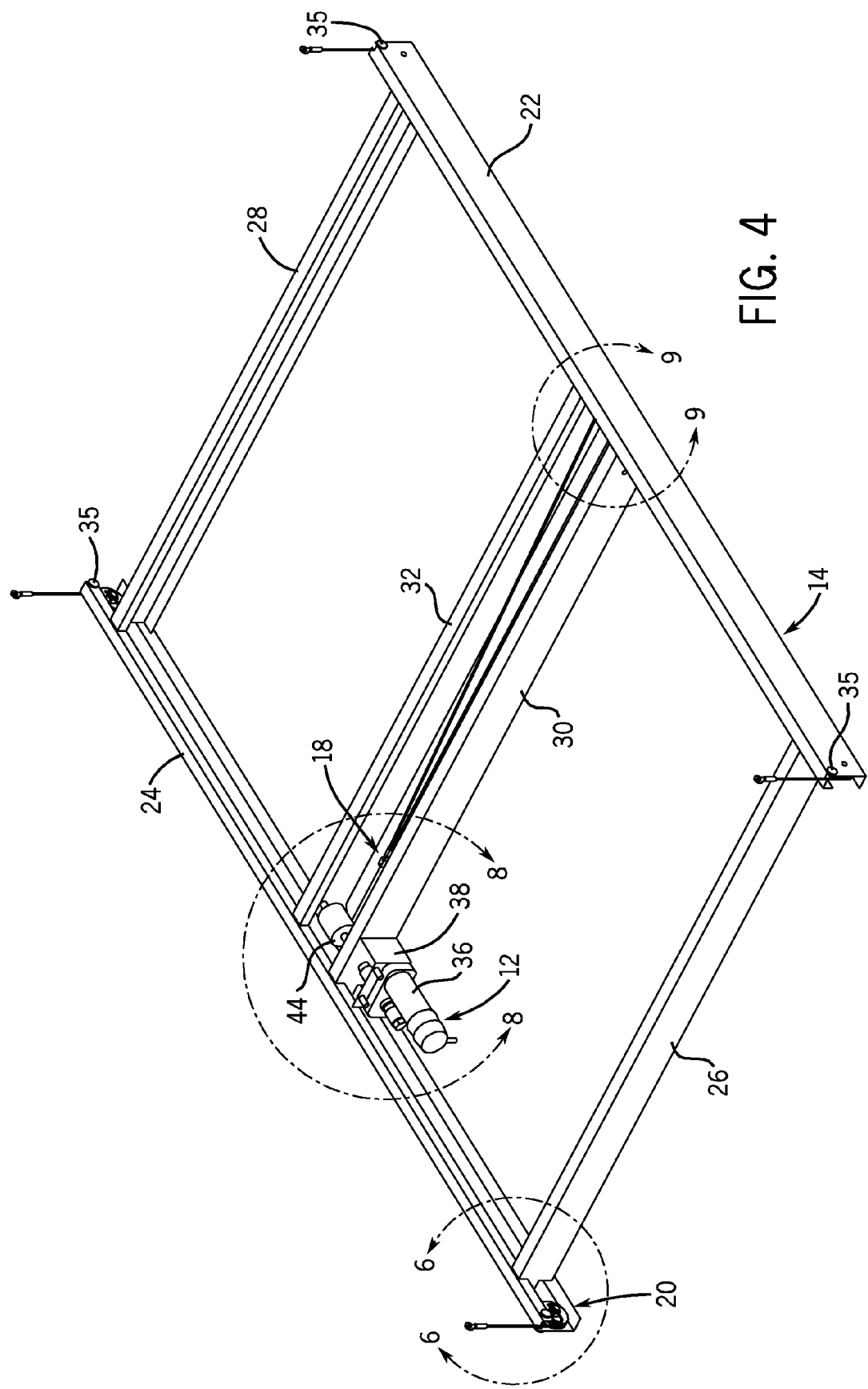
FIG. 4 is a perspective view of the lift mechanism albeit without an upright frame assembly.

Referring now to FIGS. 1-4, the primary components of the lift mechanism 10 include a drive unit 12, a support assembly 14, an upright frame assembly 16, a flexible drive assembly 18 and a guide assembly 20. As best shown in FIG. 4, the support assembly 14 is a framework of channel members including long front 22 and back 24 channels and shorter end channels 26 and 28 and center channels 30 and 32, with the open face of each channel facing inward toward the center. The channels are joined in any suitable manner, such as by weldment or mechanical fasteners, using any standard joinery, such as overlapped or recessed joints. In the preferred embodiment shown in the drawings, the support assembly 14 is sized to support a standard or other sized mattress (not shown) with or without its own frame or box spring.

Figure 7:
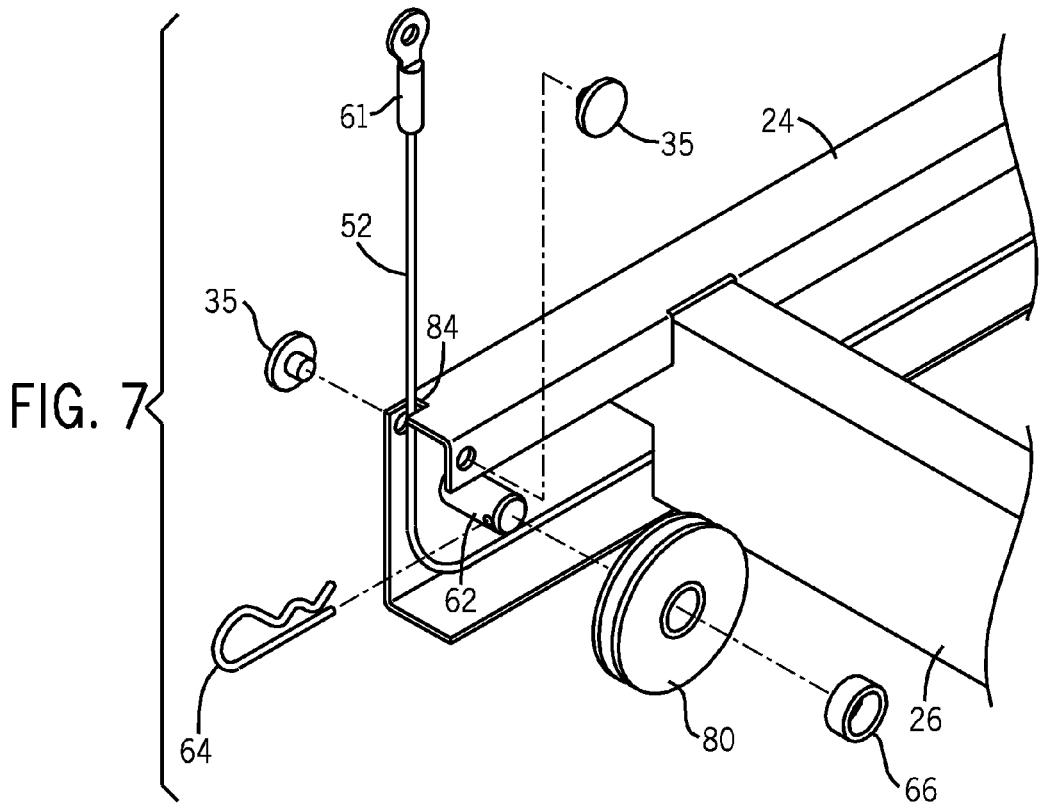
FIG. 7 is an exploded perspective view thereof.

As shown in FIG. 3, the upright frame assembly 16 includes four vertical channel members 34 at the four corners of the support assembly 14. The open faces of these channels 34 receive the ends of the front 22 and back 24 channels allowing the support assembly 14 to move up and down therein. Wear pads 35 mounted to the front 22 and back 24 channels (as shown in FIG. 7), or any bushings, rollers or other friction reducing members, can be used at this junction to facilitate easier and smoother movement. The channels 34 of the upright frame assembly 16 are bolted or otherwise fixed to opposite side walls of the vehicle room or to the floor and ceiling at opposite ends. The top and bottom ends of these channels 34 may be either capped or run full height of the room so that the support assembly 14 can not be decoupled readily.

Figure 8:
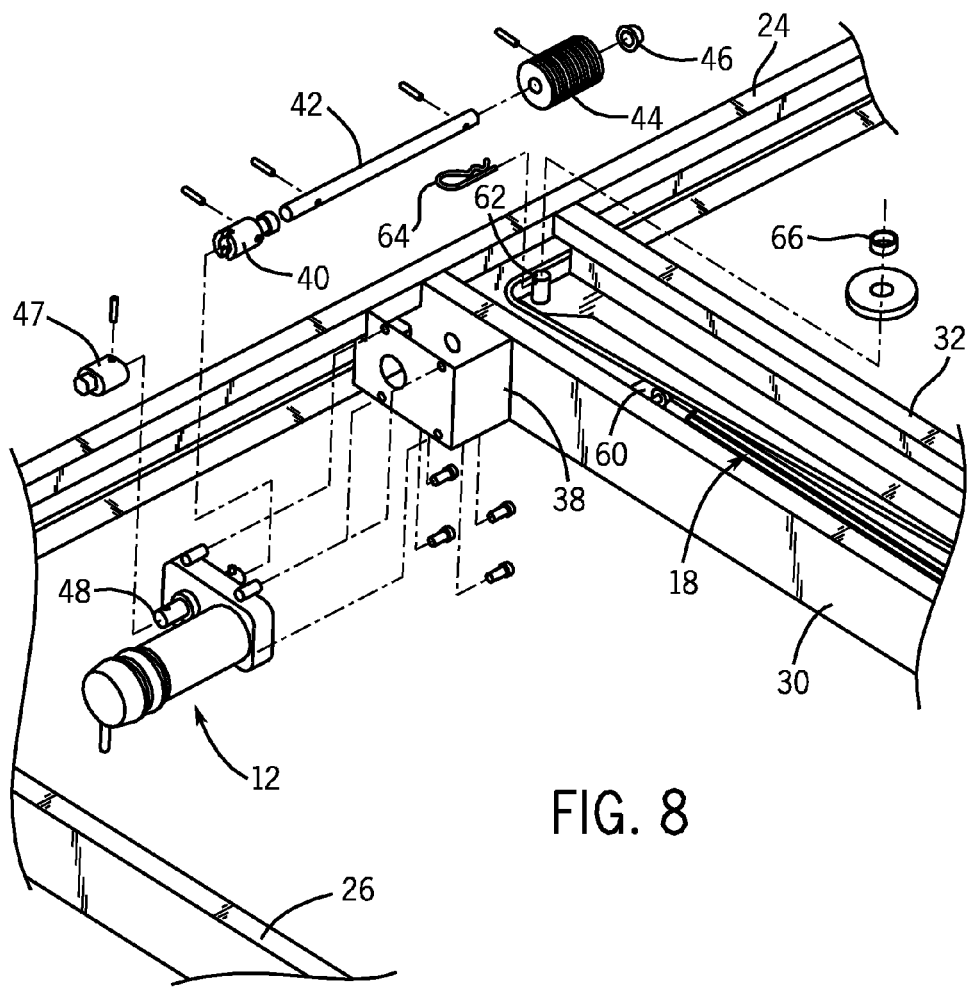
FIG. 8 is an exploded detail view of the assembly outlined in box 8 of FIG. 4.
Figure 9:
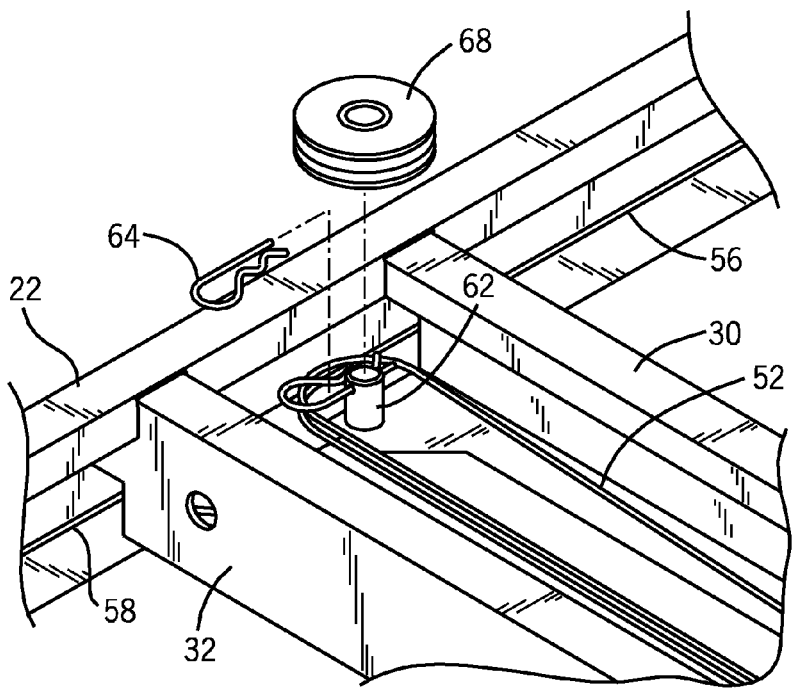
FIG. 9 is a rear detail view of the assembly outlined in box 9 of FIG. 4.

The height adjustment of the support assembly 14 is accomplished by actuating the drive unit 12 to move the flexible drive assembly 18. As shown in FIGS. 4 and 8, the drive unit 12 is preferably a suitable bidirectional electric motor and gear box assembly 36 bolted to a motor mount flange 38 which is welded to the support assembly 14, at the junction of the back channel 24 and the center channel 30. A coupler 40 is mounted to the output stub of the motor/gear assembly 36 to connect a spindle shaft 42 in turn mounting a spindle 44 and a retaining bushing 46. The shaft 42 extends through openings in the motor mount flange 38 and the center channel 30 so that the spindle 44 is disposed in the space between the two center channels 30 and 32. A hex coupler 47 is mounted to a rearward output stub 48 of the motor/gear assembly 36 to permit manual rotation or the shaft 44 for service or in the event of power failure.

Figure 5:
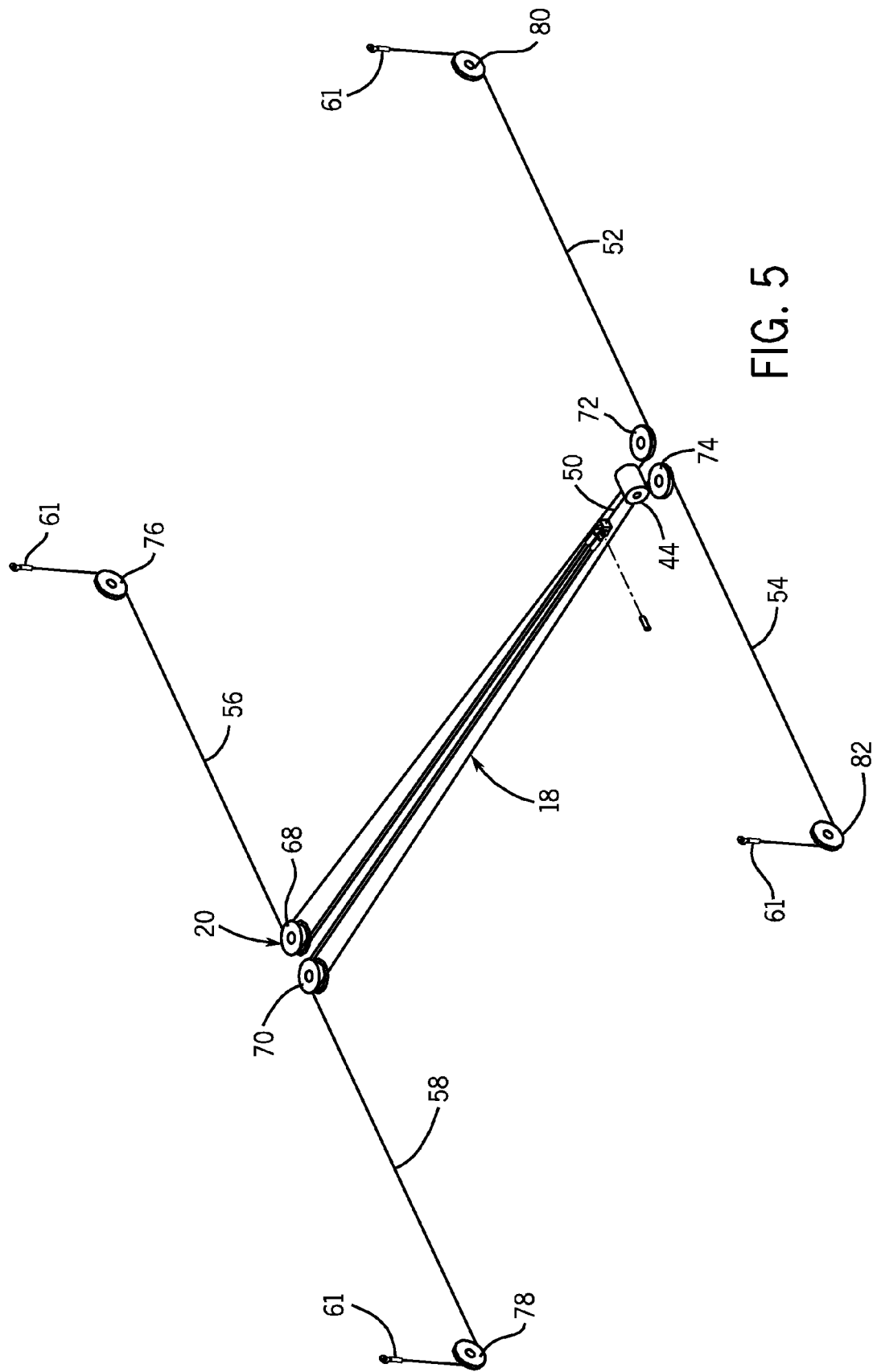
FIG. 5 is a rear perspective view showing a cable and pulley arrangement of the lift mechanism.
Figure 6:
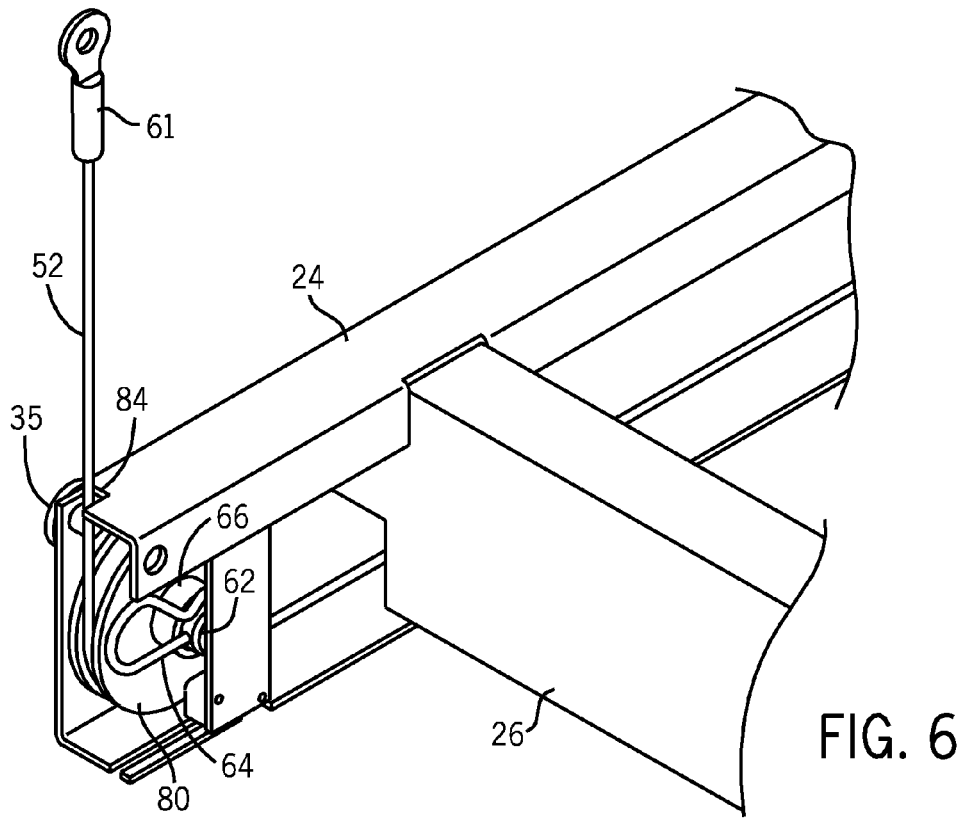
FIG. 6 is a detail view of the assembly outlined by box 6 in FIG. 4.

Operation of the motor gear assembly 36 turns the spindle 44 which moves the flexible drive assembly 18. As shown in FIG. 5, in the preferred embodiment the flexible drive assembly 18 is an assembly of cables. Specifically, the assembly includes a leader cable 50, two long cables 52 and 54, and two short cables 56 and 58. One end of each cable 52-58 is coupled via a crimp coupler 60 together with the other cables and to an end of the leader cable 50. The other end of the leader cable 50 is coupled to the spindle 44 so that the leader cable 50 is wound about the spindle 44 when the shaft 42 is turned. Clockwise rotation of the shaft 42 winds the leader cable 50 onto the spindle 44 and counter-clockwise rotation unwinds the leader cable 50 from the spindle 44, so when unwinding gravity lowers the support assembly 14.

This in turn causes the other cables 52-58 to move through the support 14 and upright frame 16 assemblies as directed by the guide assembly 20, and thereby raise or lower the support assembly 14 because the non-coupled ends of the cables 52-58 are fixed to the tops of the channel members 34 by fasteners 63 (see FIG. 3), or to the vehicle room frame (such as ceiling joists), via connectors 61. As shown in FIGS. 5-7 and 9, the guide assembly 20 includes a number of pulleys or sheaves mounted on stub shafts 62, with a clip pin 64 separated from the pulley by a spacer 66, at various locations of the support assembly 14. Specifically, the guide assembly 20 has two horizontally oriented double groove pulleys 68 and 70 mounted to the respective center channels 30 and 32 near their junction with the back channel 24 just behind the spindle 44. Two horizontally oriented single groove pulleys 72 and 74 mounted to the respective center channels 30 and 32 at their junction with the front channel 22. Two vertically oriented single groove pulleys 76 and 78 (and 80 and 82) are mounted to opposite ends of both the front 22 and back 24 channels.

The arrangement of the guide assembly 20 defines the cable assembly pathway as shown in FIG. 5. In particular, the short cables 56 and 58 extend from the crimp coupler 60 and between the two double groove pulleys 68 and 70, with cable 56 wrapping approximately 90 degrees around the bottom groove of pulley 68 and then around (again about 90 degrees) and up pulley 76. Similarly, cable 58 wraps around the bottom groove of pulley 70 and up and around pulley 78. The long cables 52 and 54 also extend back from the crimp coupler 60 between the double groove pulleys 68 and 70, However, cable 52 wraps around the upper groove of pulley 68 approximately 180 degrees and doubles back between the single groove pulleys 72 and 74 where it wraps around pulley 72 approximately 90 degrees and then around and up (again approximately 90 degrees) pulley 80. Cable 54 follows a similar (mirror image) path albeit wrapping around the upper groove of pulley 70 approximately 180 degrees and then pulleys 74 and 82, each approximately 90 degrees. The front 22 and back 24 channels have small notches 84 through which vertical lengths of the cables 52-58 pass after/before engaging the vertical pulleys 76-82.

As mentioned, operating the drive unit 12 to rotate the shaft 42 clockwise will cause the leader cable 50 to wind upon the spindle 44. This causes the leader cable 50 to pull the other cables 52-58 from front to back, thereby shortening their effective length and raising the support assembly 14. Note that the lengths of the cables are selected so that none of the other cables 52-58 wind onto the spindle 44, even when the support assembly 14 is fully raised. Reversing direction of the motor/gear assembly 36 will unwind the leader cable 50 and effectively lengthen the other cables 52-58, thereby lowering the support assembly 14. A motor control, limit switch or other devices (not shown) can be used to set the limits of vertical travel.

Thus, in the preferred embodiment, a bunk bed can be raised up out of the way when not being used, which increases the effective floor space in the room. When needed, it can be lowered into place for use. The operation can be performed using a simple wall switch mounted in a convenient location. Various space monitoring devices, such as photo-sensors and the like, can be used to prevent the support assembly 14 from being lowered when objects or people are in the space directly below it.

It should be appreciated that merely a preferred embodiment of the invention has been described above. However, many modifications and variations to the preferred embodiment will be apparent to those skilled in the art, which will be within the spirit and scope of the invention. Therefore, the invention should not be limited to the described embodiment. To ascertain the full scope of the invention, the following claims should be referenced.

What is claimed is:

1. In a recreational vehicle, a lift mechanism for raising and lowering a platform in an interior of the vehicle, the lift mechanism comprising:
    a frame;
    a drive unit;
    a support member supporting the platform and connected to the frame to be vertically movable relative to the frame;
    an elongated flexible member having a first end linked to the drive unit and a second end fixed relative to the frame; and
    at least one guide member engaging the flexible member between the first and second ends and directing the flexible member through at least one turn;
    wherein the drive unit drives the first end of the flexible member to adjust the height of the support member;
    wherein the flexible member includes multiple elongated segments, each segment having a first end coupled together with the first ends of the other segments and to the drive unit and each segment having a second end coupled to the frame, such that travel of the first ends in one direction raises the support member and travel of the first ends in an opposite direction lowers the support member.

2. The lift mechanism of claim 1, wherein the drive unit is mounted to the support member.

3. The lift mechanism of claim 2, wherein the drive unit is an electric motor.

4. The lift mechanism of claim 1, wherein the support member is a lateral frame assembly.

5. The lift mechanism of claim 1, wherein the flexible member is a cable and the at least one guide member is at least one rotatable sheave.

6. The lift mechanism of claim 5, wherein at least a length of the cable passes around the at least one sheave essentially 180 degrees.

7. The lift mechanism of claim 1, wherein there are a plurality of sheaves.

8. The lift mechanism of claim 7, wherein at least one of the sheaves is a double groove sheave.

9. The lift mechanism of claim 7, wherein there are at least eight sheaves.

10. The lift mechanism of claim 1, wherein the flexible member includes a leader segment extending between a rotatable spindle of the drive unit and the first ends of the elongated segments.

11. The lift mechanism of claim 1, wherein the frame includes four channels, one at each corner of the support member.

12. The lift mechanism of claim 1, wherein the first end of the flexible member couples to the drive unit at a rotatable spindle.

13. The lift mechanism of claim 1, wherein the platform is a bunk bed.

14. The lift mechanism of claim 1, wherein the at least one guide member is linked to the support member.

15. A recreational vehicle, comprising a wheeled chassis supporting a vehicle body defining an interior containing a lift mechanism for raising and lowering a platform moved vertically by an elongated flexible member having a first end linked to a drive unit and a second end linked to a frame member fixed relative to the vehicle, and wherein there is at least one guide member engaging the flexible member between the first and second ends and directing the flexible member through at least one turn as the drive unit drives the first end of the flexible member to adjust the height of the platform;
    wherein the flexible member includes multiple elongated segments, each segment having a first end coupled together with the first ends of the other segments and to the drive unit and each segment having a second end coupled to the frame, such that travel of the first ends in one direction raises the support member and travel of the first ends in an opposite direction lowers the support member.

* * * * *